United States Patent Office 3,071,528
Patented Jan. 1, 1963

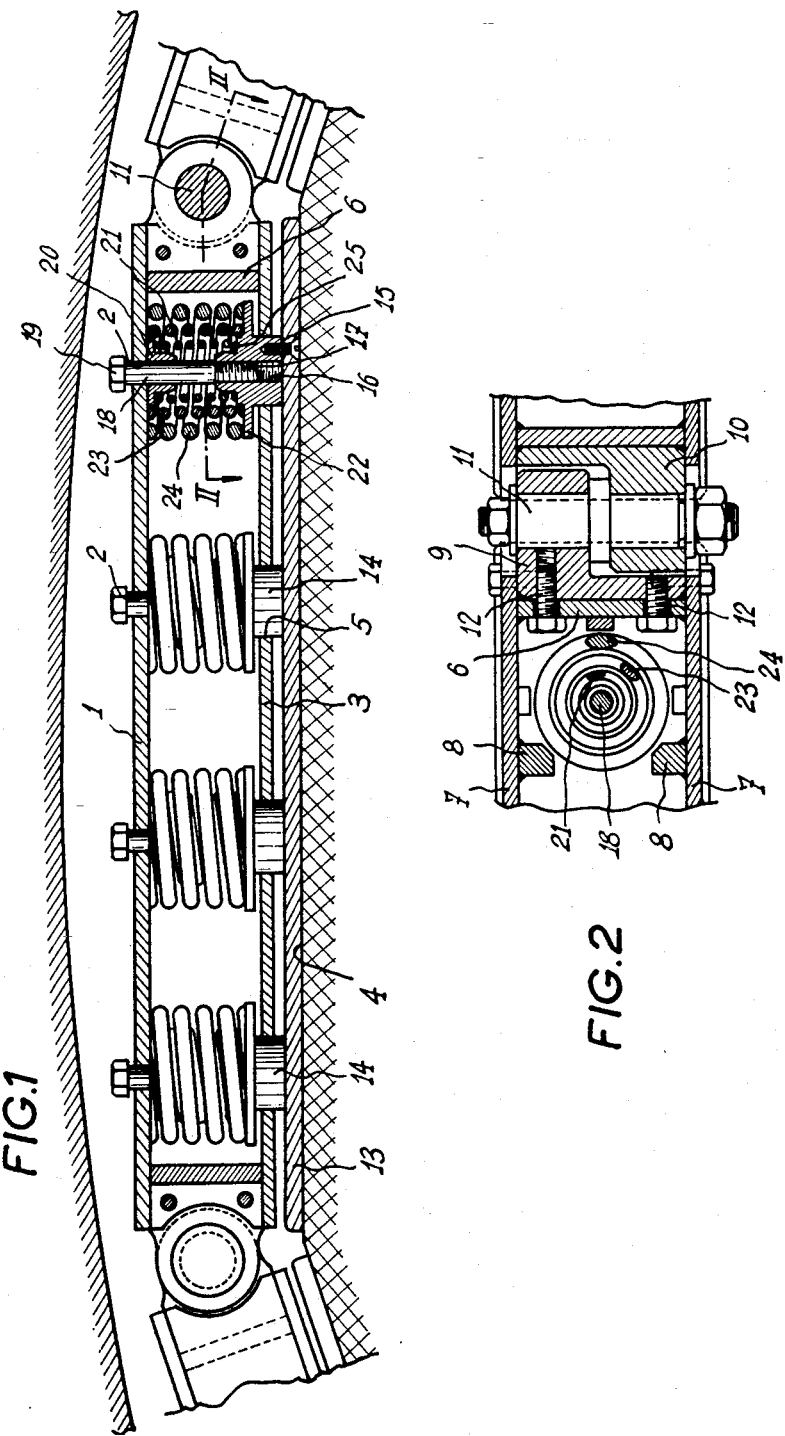

3,071,528
LINKS FOR GIRDLING A VERTICAL STACK OF MODERATOR UNITS IN A NUCLEAR REACTOR
Henri Correc, Paris, France, assignor to Commissariat A l'Energie Atomique, Paris, France
Filed May 25, 1959, Ser. No. 815,371
Claims priority, application France June 5, 1958
4 Claims. (Cl. 204—193.2)

The present invention is concerned with improvements in or relating to links for girdling a vertical stack of moderator units in a nuclear reactor, for example, graphite blocks.

The invention relates especially to a horizontal girdle which is more particularly capable of use on the upper portion of the stack, where the presence of heavy ballast plates at the top of the stack causes the blocks to have the greatest tendency to move away from one another during thermal or nuclear expansion.

One of the objects of the invention is consequently to hold the blocks in place efficaciously by means of a very highly resistant girdle, elastic means being, however, provided in order to allow the stack to expand to a certain degree in the horizontal direction. Such a girdle is according to the invention made up of a plurality of links and according to the invention there is provided a link comprising a frame, at each end of the frame is a hinge member for receiving a hinge pin whereby the frame may be hingedly coupled to two other links, a plurality of spaced compression springs carried by the frame and thrust means movable against the springs in a plane normal to the axis of articulation of the hinge members.

In order that the present invention may be understood there will now be described one embodiment thereof, given by way of example only, reference being had to the accompanying drawing, in which:

FIGURE 1 is a horizontal section through part of a girdle according to the invention, illustrating a complete frame in detail, with its springs and its articulations to the adjacent frames.

FIGURE 2 is a section along II—II in FIGURE 1.

Only the elements required for an understanding of the invention are illustrated in these figures, corresponding elements in these different figures bearing identical reference numbers.

As may be seen in FIGURE 1, a girdle comprises links each of which comprises a frame having a plate 1 pierced with orifices 2 and a plate 3 situated on the side of the graphite stack 4, the said plate 3 likewise being pierced with orifices 5. Struts 6 join the plates 1 and 3, and sheets 7 (FIG. 2) are welded to the latter and to other struts 8 which maintain the spacing between the plates 1 and 3.

At each end, the frame comprises a hinge element 9 or 10, and the frames are articulated to one another by means of a pin 11 engaging in the hinge elements 9 and 10. These elements 9 and 10 may, for example, be attached to the frame by bolts 12 or by welding.

Each frame bears against one face of the vertical graphite stack 4 by way of a bearing plate 13. This plate is engaged by studs 14 which pass through the orifices 5 in the plate 3 of the frame.

As may be seen in the right portion of FIGURE 1, the bearing plate 13 is attached to the studs 14 by screws 15, and each stud is pierced with a tapped orifice 16 which receives the threaded end 17 of a bolt 18 whereof the stem passes through the corresponding orifice 2 in the plate 1 of the frame.

The head 19 of each bolt 18 may rest on the plate 1 when the bearing plate 13 is not pressing against the corresponding face of the stack 4. Around the stem of each bolt 18, and inside the frame, there is a bearing member 20 which is urged against the plate 1 by a spring 21.

Each stud 14 is provided with a collar 22 against which co-axial springs 23 and 24 bear. Springs 23 and 24 also bear against the plate 1 of the frame. The spring 21 is likewise co-axial with the springs 23 and 24, and bears against a shoulder 25 on the collar 22.

The springs 21, 23 and 24 together urge each stud 14 radially toward the stack, and efficaciously cause the plate 13 to bear against the said stack.

The girdle holds the stack of graphite blocks together, especially in the stages in which those forces which tend to move the blocks outwardly away from one another are the greatest. In addition, the stack is held together by means of compression springs of elastic strength chosen to correspond to the forces which the springs resist.

What is claimed is:
1. A link for a girdle surriunding a nuclear reactor solid moderator structure comprising a frame, inner and outer parallel plates with respect to the moderator structure for said frame, a hinge member at each end of said frame, a hinge pin for each of said hinge members whereby said frame may be hinged to adjacent links, a plurality of spaced compression springs mounted in said frame between said plates and a bearing plate outside of said frame and spaced from and adjacent to said inner plate receiving thrust and movable relatively to said frame and said inner plate against said springs in a plane normal to the axis of articulation of said hinge member.
2. A link as described in claim 1 including a stud secured to said plate for each of said springs receiving the thrust of its corresponding spring.
3. A link as described in claim 2, said studs passing through apertures in said inner plate, each of said springs being mounted between its studs and said outer plate, and a bolt for each of said studs slidably mounted in an aperture in said outer plate.
4. A link as described in claim 3 in which each of said springs comprises a plurality of concentric springs.

References Cited in the file of this patent
UNITED STATES PATENTS
482,664    Weissenborn _____ Sept. 13, 1892
2,853,440  Hughes _____ Sept. 23, 1958
2,865,828  Long et al. _____ Dec. 23, 1958